Sept. 10, 1968    R. E. MATTER    3,400,573
GAGING METHOD AND APPARATUS
Filed June 27, 1966    5 Sheets-Sheet 1

INVENTOR.
ROGER E. MATTER
BY
his ATTORNEYS

INVENTOR.
ROGER E. MATTER
BY Brumbaugh, Free,
Graves & Donohue
his ATTORNEYS

Sept. 10, 1968  R. E. MATTER  3,400,573
GAGING METHOD AND APPARATUS
Filed June 27, 1966  5 Sheets-Sheet 3
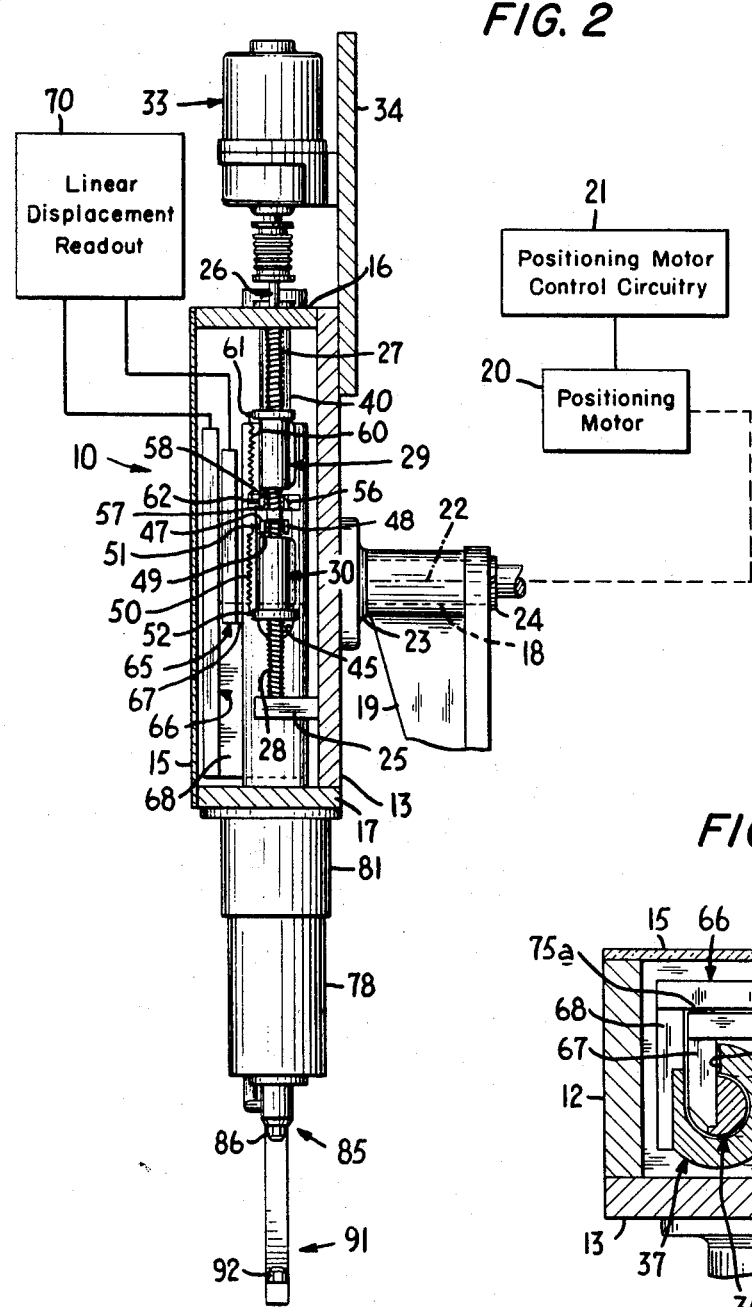
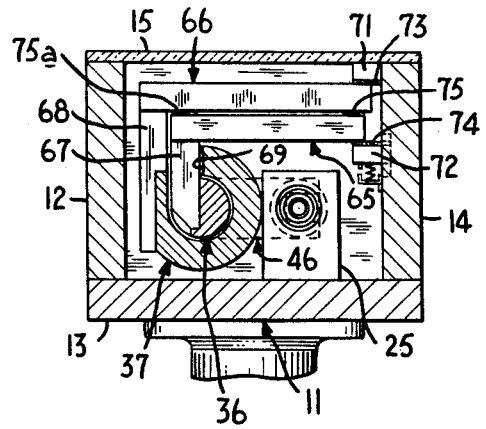
INVENTOR.
ROGER E. MATTER
BY
Brumbaugh, Free, Graves & Donohue
his ATTORNEYS Sept. 10, 1968     R. E. MATTER     3,400,573
GAGING METHOD AND APPARATUS
Filed June 27, 1966     5 Sheets-Sheet 4
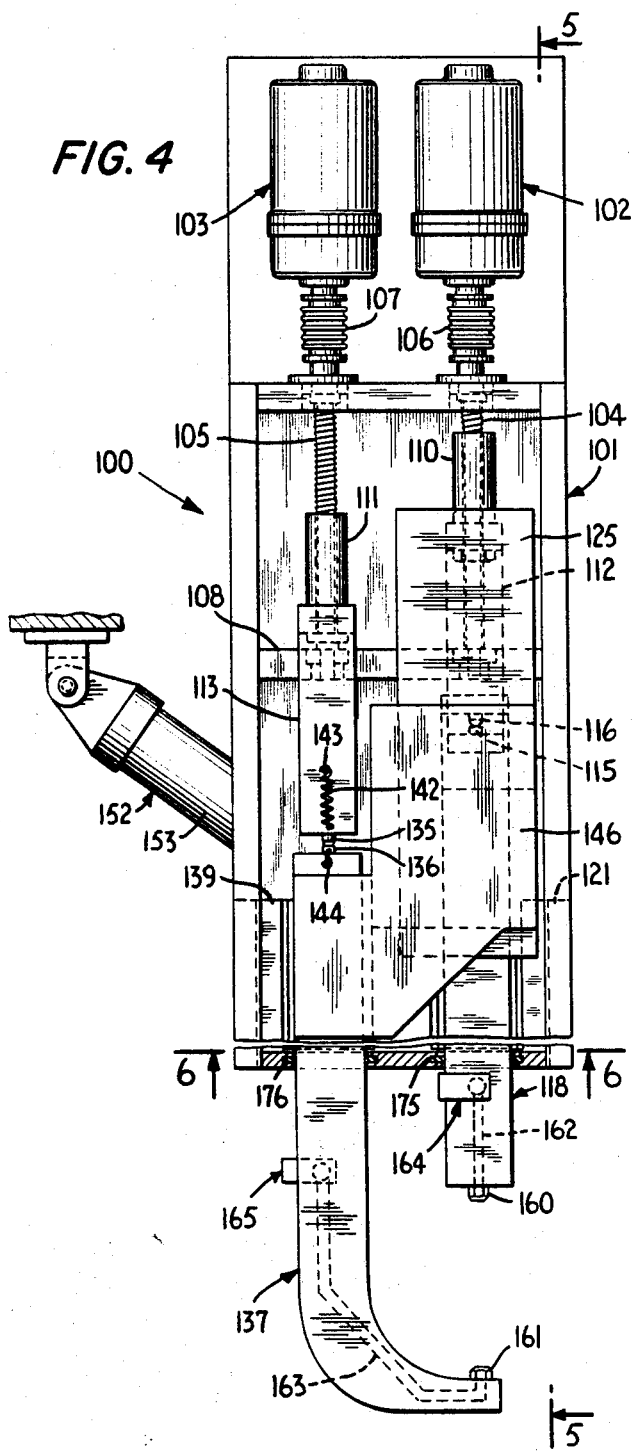
INVENTOR.
ROGER E. MATTER
BY
Brumbaugh, Free, Graves & Donohue
his ATTORNEYS Sept. 10, 1968             R. E. MATTER             3,400,573

GAGING METHOD AND APPARATUS

Filed June 27, 1966                                5 Sheets-Sheet 5

INVENTOR.
ROGER E. MATTER

BY
his        ATTORNEYS

United States Patent Office 3,400,573
Patented Sept. 10, 1968

3,400,573
GAGING METHOD AND APPARATUS
Roger E. Matter, Cranston, R.I., assignor to Federal Products Corporation, Providence, R.I., a corporation of Rhode Island
Continuation-in-part of application Ser. No. 411,417, Nov. 16, 1964. This application June 27, 1966, Ser. No. 560,660
16 Claims. (Cl. 73—37.5)

ABSTRACT OF THE DISCLOSURE

A gaging system for measuring the size of an object by placing a plurality of gage jaws in spaced relation to the object, displacing the gage jaws toward the object to predetermined positions, and indicating the size of the object in response to the relative position of the gage jaws and the distances between the gage jaws and the object.

---

This invention relates to a gaging method and apparatus and, more particularly, to a new and improved method and apparatus for accurately measuring the size of an object. The invention has particular application for measuring the size of a workpiece being shaped to a desired size by a machine tool.

This is a continuation-in-part of my U.S. application Ser. No. 411,417, filed Nov. 16, 1964, now abandoned.

In order to produce an object within very close tolerances of specific desired dimensions, a given dimension must be checked periodically during a metal removal operation, for example, to determine whether sufficient rough or smooth cuts, as appropriate, have been made on the workpiece. If objects are to be produced within close tolerances of the desired dimensions by an automated machine tool, a gaging apparatus is required which can be selectively placed in a gaging position from which sensing elements such as gage jaws may be extended into gaging relation with the workpiece and in a retracted position remote from the workpiece so that additional cuts may be made as necessary. Preferably, the gaging operation is accomplished without physical contact being made between the gaging apparatus and the workpiece, so that any marking or scarring of the work surface is avoided and possible damage to the gaging apparatus is prevented.

It is an object of the present invention to provide a new and improved gaging method and apparatus having the above-mentioned advantages.

Another object of the invention is to provide apparatus for measuring the size of an object which is susceptible to either manual operation or incorporation in an automated machine tool.

A further object of the invention is to provide an automatically self-adjusting gaging apparatus which employs air gaging techniques to sense the distance between each gage jaw and an object to be measured.

These and other objects of the invention are attained by placing a plurality of gage jaws in spaced relation to the object to be gaged, displacing the gage jaws toward the workpiece to predetermined positions, and indicating the size of the workpiece in response to the relative position of the gage jaws and the distances between the gage jaws and the workpiece.

In one embodiment, the gage jaws are positioned at a predetermined distance from the object, preferably by air gaging techniques, and an independent readout system indicates the relative position of the gage jaws. The gage jaws may be simultaneously driven toward or away from the object to be gaged, as desired. Alternatively, each gage jaw may be driven independently of the others, so that an accurate measurement may be made even if the center line of the object is not located equidistant from the gage jaws. In another embodiment, the gage jaws are displaced to a predetermined relative position, and the distances between the gage jaws and the workpiece are sensed, preferably by air gaging techniques.

Other objects and advantages of this invention will be apparent from a reading of the following detailed description in conjunction with the accompanying drawings showing preferred embodiments, wherein:

FIG. 2 is a front elevational view taken in a plane indicated by the line 2—2 of FIG. 1 and looking in the direction of the arrows;

FIG. 3 is a sectional view taken in a plane indicated by the line 3—3 of FIG. 1 and looking in the direction of the arrows;

FIG. 4 is a side elevational view, portions being removed, illustrating another embodiment of gaging apparatus in accordance with the invention;

FIG. 4A is a block diagram of control apparatus to be used in conjunction with the gaging apparatus of FIG. 4;

Figure 1A:
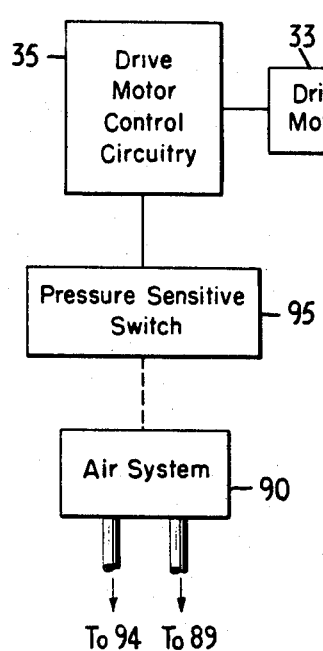
FIG. 1A is a block diagram of control apparatus to be used in conjunction with the gaging apparatus of FIG. 1.

In the typical embodiment of the invention shown in FIGS. 1, 1A, 2 and 3, the gaging apparatus 10 includes a gage frame 11 comprising three side plates 12, 13 and 14, a cover plate 15, an upper plate 16 and a lower plate 17. The gage frame 11 is supported by a shaft 18 suitably secured to the side plate 13, the shaft being rotatably mounted in a support frame 19. The end of the shaft 18 remote from the gage frame is coupled to an electric motor 20 which may be operated by means of suitable electrical control circuitry 21, for example, in order that the gaging apparatus may be rotated about the axis 22 into or away from a gaging position. It is to be understood that suitable mechanical stops and electrical limit switches (not shown) are provided as necessary to insure that the gaging apparatus assumes the exact positions desired. The shaft 18 is provided with a flange 23 and a collar 24 in order to prevent axial displacement of the shaft.

Rotatably mounted on the upper plate 16 and on a pedestal 25 secured to the side plate 13 is a double lead ball screw 26 provided with a right-hand thread portion 27 and a left-hand thread portion 28, for example. Suitable bearings (not shown) are provided in the upper plate and the pedestal. Threadedly mounted on the threads 27 and 28 are ball nuts 29 and 30 respectively. Arms 31 and 32 extending from the nuts 29 and 30, respectively, prevent rotation of the nuts, as will be explained presently, so that rotation of the ball screw 26 in the appropriate direction drives the nuts simultaneously toward or away from each other, as desired. Coupled to the free end of the ball screw is a suitable drive motor 33, which is mounted on a plate 34 secured to the side plate 13. The drive motor is energized through appropriate electrical control circuitry 35 in order to rotate the ball screw 26 in the direction and to the degree desired.

Coaxially mounted by the gage frame 11 are an inner tube 36 and an outer hollow tube 37, a pair of bushings 38 and 39 mounted on the inner wall of the outer tube permitting the inner tube to be displaced smoothly therein. Axial alignment of the two tubes is insured by a guide post 40 secured to the upper plate 16 and adapted to receive a bushing 41 mounted on the interior wall at the end of the outer tube, and by a bushing 42 mounted in a bore 43 in the lower plate 17, through which the two tubes extend. The bushings 37, 38, 41 and 42 may be of a suitable material such as Teflon, for example.

The outer tube 37 is provided with a longitudinal slot 45 through which extends an arm 46 secured at one end to the upper end of the inner tube 36. The other end of the arm 46 is bifurcated to form two fingers 47 and 48 disposed on opposite sides of the ball screw, a bead 49 being formed on the lower surface of the finger 47 and adapted to bear against the upper surface of the ball nut 30. A tension spring 50, mounted between a pin 51 on the finger 47 and a pin 52 at the lower end of the nut 30, urges the arm 46 against the nut 30, such spring loading preventing backlash in the screw drive system for the inner tube 36. The arm 32 extends from the ball nut 30 into the slot 45 in order to prevent rotation of this ball nut (rotation of the outer tube 37 being prevented by means to be discussed below).

Secured to the outer tube 37 is an arm 55 which is similarly bifurcated to form a pair of fingers 56 and 57 about the ball screw, a bead 58 on the upper surface of the finger 57 being adapted to bear against the lower surface of the ball nut 29. A tension spring 60, mounted between a pair of pins 61 and 62 on the nut 29 and arm 55, respectively, prevents backlash in the screw drive system for the outer tube 37. Furthermore, by driving the tubes 36 and 37 toward each other through the tension springs 50 and 60, respectively, possible damage to the gaging apparatus or the workpiece is avoided should the tubes inadvertently be overdriven and contact the workpiece. Rotation of the ball nut 29 is prevented by a pin 63, which is seated in the tube 37 and engages the arm 31 of the nut 29.

A pair of sensing elements 65 and 66 are secured at one end to the inner tube 36 and the outer tube 37, respectively, by a pair of blocks 67 and 68, the block 67 extending through a slot 69 provided in the outer tube 37. The sensing elements are incorporated in a highly accurate linear displacement readout system including the linear displacement readout 70 and are preferably the glass slides of a Farrand Inductosyn System, a product of Farrand Controls, Inc., 99 Wall St., Valhalla, N.Y. which is in itself well known to the art. The free ends of the slides 65 and 66 are slidably disposed between a pair of guide rails 71 and 72, so that rotation of the tubes 36 and 37 is prevented. The slide-contacting surfaces of the guide rails are provided with bearing strips 73 and 74 of Teflon, for example, and a pair of Teflon bearing strips 75 and 75a are disposed between the two slides in order to insure that the slides move smoothly between the guide rails. The guide rail 71 is fixed, while the guide rail 72 is preferably spring-mounted to urge the sensing elements against the fixed guide rail.

The lower end of the inner tube 36 carries a collar 78, an annular space 79 between the tube and the collar receiving a sleeve 80, which is secured to the tube 36 and is adapted to slide between, and relative to, this tube and the collar when there is relative movement between the inner and outer tubes. This sleeve prevents grit, dirt and the like from fouling the bearing surfaces of the inner tube and the bushing 38 and from entering between the two tubes. Similarly, a housing 81 mounted on the lower plate 17 protects the bearing surfaces of the outer tube and the bushing 42 from foreign matter. To insure that no foreign matter can contaminate any bearing surfaces or enter between the tubes or within the gage frame 11, compressed air is supplied from a suitable source (not shown) to the interior of the gage frame through a suitable fitting 82 in the side plate 12. The compressed air escapes around the bushings 38 and 42, between the collar 78 and the housing 81, and between the collar and the sleeve 80, as well as through any openings that may exist in the gage frame enclosure, thereby expelling any dirt which may have a tendency to enter at these points.

The lower end of the inner tube 36 comprises an upper gage jaw 85, on which is mounted a nozzle 86. The orifice of the nozzle communicates through a conduit 88 to a fitting 89, to which air under pressure is supplied from an air system 90. Mounted on the outer tube 37 is a lower gage jaw 91 which carries the nozzle 92 disposed in opposed, facing relation to the nozzle 86. The lower gage jaw is suitably bored at 93 to communicate the orifice of the nozzle 92 with a fitting 94, which is connected to the air system 90. Operatively associated with the air system is a pressure sensitive switch 95, which is electrically coupled with the drive motor control circuitry 35 and is adapted to de-energize the drive motor 33 in response to a predetermined pressure in the air system 90.

In order to measure a dimension of a workpiece, the positioning motor 20 is energized through the control circuitary 21 to swing the upper and lower gage jaws to a gaging position in which the nozzles 86 and 92 are on opposite sides of, and equidistant from, the workpiece. The support frame 19 may be appropriately adjusted by any suitable means (not shown) known to the art to enable the adjustment of its position with respect to the workpiece as required.

The gage jaws being in the gaging position, the drive motor 33 is energized through the control circuitry 35 to rotate the double lead screw 26 in the appropriate direction to displace the gage jaws simultaneously toward the workpiece. During this displacement of the gage jaws air is supplied through the fittings 89 and 94 to the nozzles 86 and 92, so that an air jet is directed from each nozzle toward the other nozzle. As the nozzles approach the workpiece, the back pressure in the air system increases accordingly, so that this back pressure is a measure of the distances between the nozzles and the adjacent surfaces of the workpiece. This air gaging technique in itself is well known to the art. In this embodiment of the invention, however, the air gaging is employed only to sense that the gage jaws have reached a position at a predetermined distance from the workpiece. When the gage jaws reach this predetermined position, the switch 95 is operated to deenergize the drive motor 33, so that the gage jaws remain spaced from the workpiece by the predetermined distance. The relative position of the slides 65 and 66 indicates the relative position of the gage jaws, which is then a measure of the dimension of the workpiece, since the distance between the two nozzles equals the workpiece dimension plus twice the predetermined distance between the workpiece and each nozzle. The Farrand Inductosyn System incorporating the slides 65 and 66 is preferably calibrated to indicate the dimension of the workpiece directly. In this way, the workpiece is gaged without physical contact being made between any part of the gaging apparatus and the workpiece, so that possible scarring of the work surface is avoided and damage to, or decalibration of, the gaging apparatus is prevented.

The workpiece dimension having been determined, the direction to displace the gage jaws away from the workcuitry 35 to rotate the feed screw 26 in the opposite direction to displace the gage jaws away from the workpiece, and the positioning motor 20 is energized through the control circuitry 21 to rotate the gaging apparatus away from the workpiece so that additional cuts may be made by a machine tool, for example, as necessary.

Although the correct position of the axis 22 with respect to the workpiece is obtained by appropriate adjustment of the support frame, 19, as explained above, some compensation is obtained for slight misalignment between the gaging apparatus and the workpiece by averaging the back pressures obtained from the two jaws. Thus, for example, one jaw could be more distant from the work surface than the predetermined value by the same amount as the other jaw is closer than this value, and the slides 65 and 66 would indicate the dimension to be measured correctly.

This gaging apparatus is especially suited for use in a completely automated machine tool, programmed on magnetic tape, for example. The techniques employed to automate machine tools are beyond the scope of this invention and need not be discussed here. In accordance with the program, a grinding machine, for example, makes a rough cut on the workpiece. The gage is swung from its retracted position into its gaging position, and the drive motor advances the gage jaws toward the workpiece. When the jaws reach the predetermined distance from the work surface, the air system deactivates the drive motor. The readout system indicates whether the desired rough cut dimension has been reached. Then the gage jaws are withdrawn and the gage is retracted. The grinder makes additional rough cuts as necessary, and then is commanded to make smooth cuts until the readout system indicates that the final dimension has been attained.

If desired, the gaging apparatus could be used manually, the operator energizing the drive motor 33 and the positioning motor 20 by manual electrical switches in the corresponding electrical control circuitry and visually observing the dimension being measured on the readout system. In this regard, a simplified readout system might comprise appropriate scale markings on the slides 65 and 66, which are visible through the transparent cover plate 15. Preferably the pressure sensitive switch 95 would be employed in the manually operated use of the gage to stop the jaws at the predetermined distance from the workpiece. If desired, however, the operator could perform this step by reference to a pressure gage coupled to the air system.

Figure 1:
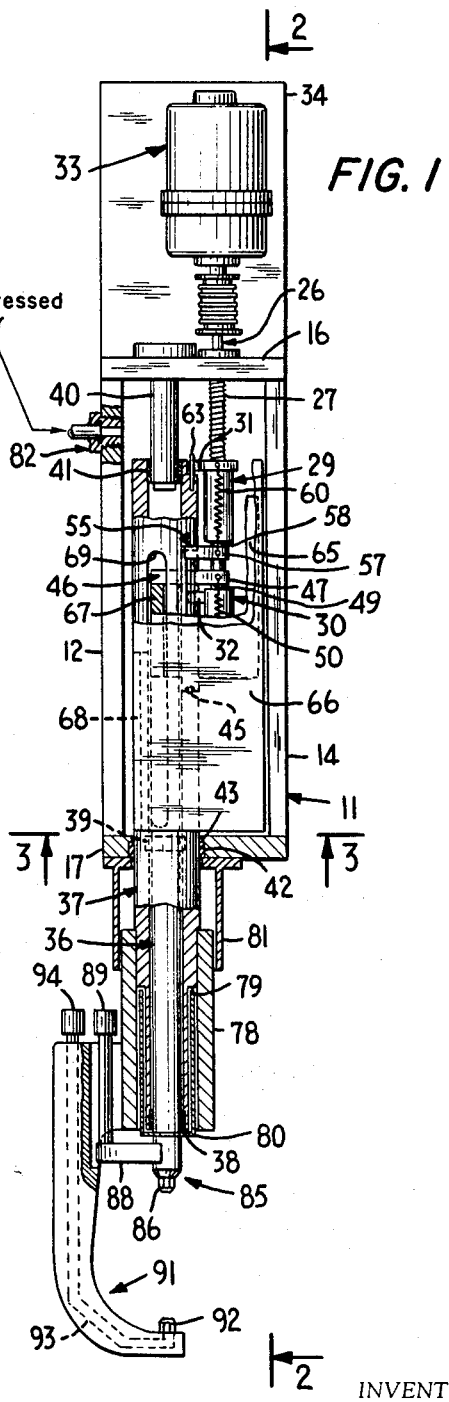
FIG. 1 is a side elevational view, partly broken away, of a typical gaging apparatus in accordance with the invention.
Figure 1B:
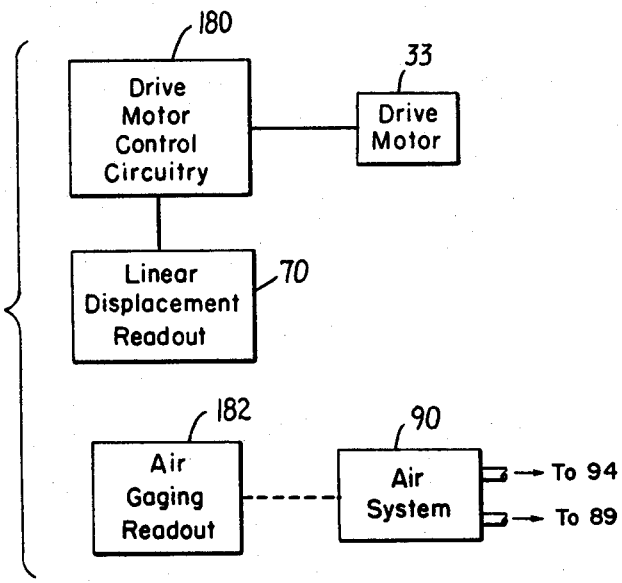
FIG. 1B is a block diagram of control apparatus to be used in conjunction with the gaging apparatus of FIG. 1 in another embodiment of the invention.

FIG. 1B is a block diagram of control apparatus for use in conjunction with the gaging apparatus shown in FIGS. 1, 2 and 3 in another embodiment of the invention. Here the linear displacement readout 70, including the sensing elements 65 and 66, is coupled to appropriate drive motor control circuitry 180, by means of which the operation of the drive motor 33 is controlled. The readout 70 feeds back the relative position of the gage jaws 85 and 91 to the control circuitry 180, so that the gage jaws may be accurately positioned at predetermined locations.

Air under pressure is supplied from the air system 90 through the fittings 89 and 94 to the nozzles 86 and 92 of the gage jaws 85 and 91, respectively, as before. Operatively associated with the air system, however, is a suitable conventional air gaging readout system 182. As is well known to the art, such a readout system measures the distances between the nozzles and the adjacent surfaces of a workpiece being measured based upon the back pressure in the air system when air jets are directed from the nozzles against the workpiece.

In order to measure a dimension of a workpiece, the upper and lower gage jaws are swung by the positioning motor 20 to a gaging position in which the nozzles 86 and 92 are on opposite sides of, and equidistant from, the workpiece, as before. The drive motor 33 is then energized through the control circuitry 180 to displace the gage jaws simultaneously toward the workpiece until the jaws reach a predetermined relative position, as sensed by the linear displacement readout 70, at which time the drive motor 33 is de-energized. Air being supplied to the nozzles 86 and 92 from the air system 90, the distance between the nozzles and the workpiece is indicated by the air gaging readout 182. The dimension of the workpiece may be had by subtracting the distance between the nozzles and the workpiece (indicated by readout 182) from the distance between the nozzles (indicated by readout 70). Alternatively, the air gaging readout 182 indicates the dimension of the workpiece relative to the predetermined distance by which the nozzles are spaced.

Thus, the workpiece is gaged without physical contact being made between any part of the gaging apparatus and the workpiece. Furthermore, some compensation is obtained for slight misalignment between the gaging apparatus and the workpiece by averaging the back pressures obtained from the two jaws, as before.

The workpiece dimension having been determined, the drive motor 33 may be energized to displace the gage jaws away from the workpiece, and the positioning motor 20 may be energized to rotate the gaging apparatus away from the workpiece. Alternatively, only the positioning motor 20 need be energized to retract the gaging apparatus from the workpiece, the gaging jaws being left at the predetermined relative position. One or more additional cuts may be made by a machine tool, for example, as necessary, after which only the positioning motor need be energized to swing the gaging apparatus to the gaging position. The new dimension of the workpiece, with reference to the predetermined distance between the nozzles, will be indicated by the air gaging readout 182. In this way, the entire metal removal operation on a workpiece might be accomplished without having to energize the drive motor 33 to displace the gage jaws, once the jaws have been placed at the predetermined relative position. This simplifies considerably the metal removal operation, whether the gaging apparatus is used in a completely automated machine tool, or manually.

If incorporated in an automated machine tool, under digital or numerical control, the gage would be swung at the proper time from its retracted position into its gaging position. Then the drive motor would be energized to advance the gage jaws to a predetermined relative position in which the nozzles might be spaced by a distance approximately 0.001 inch greater than the rough dimension of the workpiece, for example, the drive motor being de-energized in response to the linear displacement readout system. The air jet system then senses the distance between the nozzles and the workpiece. The workpiece dimension having been determined, the gage would be swung to its retracted position, and the machine tool would be commanded to make additional cuts as necessary, the progress of the operation being monitored by the gage until the air gaging readout indicates that the final dimension is attained.

If desired, the gaging apparatus including the control circuitry of FIG. 1B could be used manually, the operator energizing the drive motor 33 and positioning motor 20 by manual electrical switches and visually observing the relative position of the gage jaws on the linear displacement readout 70 and the distance between the nozzles and the workpiece on the air gaging readout 182.

Still another embodiment of the invention is shown in FIGS. 4, 4A, 5 and 6. The gaging apparatus 100 includes a gage frame 101 on which are mounted two drive motors 102 and 103, which are adapted to drive two ball screws 104 and 105, respectively, through a pair of bellows couplings 106 and 107, the ball screws being rotatably mounted between the gage frame and a pedestal 108. Threadedly engaging the ball screws 104 and 105 are a pair of ball nuts 110 and 111, respectively, to which are secured a pair or arms 112 and 113. The end of the arm 112 remote from the nut 110 carries a button 115 adapted to bear against a corresponding button 116 mounted on a slide block 117 to which is secured an upper gage jaw 118. The slide block 117 is slidably disposed between a pair of guide blocks 120 and 121 mounted on the gage frame 101, an antifriction sliding engagement being provided by a pair of ball and track assemblies 122 and 123 mounted between the slide 117 and the guide blocks 120 and 121, respectively.

A first glass slide 125 of a Farrand Inductosyn System is mouted on a plate 126 which is secured to the slide block 117 by an arm 127. The arm is bored at 128 to receive a guide pin 129 mounted on the arm 112, a compression spring 130 being disposed about the guide pin and bearing against the arm 112 and a shoulder 131 formed in the bore 128, so as to urge the buttons 115 and 116 against each other.

The end of the arm 113 remote from the ball nut 111 carries a button 135 adapted to bear against a cooperating button 136 mounted on the upper end of a lower gage jaw 137, which is secured to a slide block 138 slidably disposed between the guide blocks 120 and 139, a pair of ball and track assemblies 140 and 141 insuring an antifriction sliding engagement. The buttons 135 and 136 are urged into mutual engagement by a tension spring 142 mounted between a pair of pins 143 and 144 carried by the arm 113 and the lower gage jaw, respectively. A second glass slide 145 of the readout system is mounted on a plate 146, which is secured to the lower gage jaw 137 by means of an arm 147.

As in the first embodiment, the gaging apparatus 100 is supported by a shaft 150 suitably secured to the gage frame 101, the shaft being rotatably mounted in a support frame 151. In this embodiment, however, the gage is adapted to be swung into or away from a gaging position by a pneumatic drive assembly 152, comprising a cylinder 153 and a piston 154, the piston being pivotally mounted upon a pin 155 extending from the gage frame. The operation and control of such a pneumatic drive assembly are well known to the art and need not be discussed here. It is to be understood that appropriate stops and limit switches (not shown) may be employed as necessary to insure the accurate positioning of the gaging apparatus.

The ends of the gage jaws 118 and 137 are provided with a pair of nozzles 160 and 161 in opposed facing relation, the nozzles communicating through the passageways 162 and 163, respectively, with a pair of fittings 164 and 165. The fittings 164 and 165 are connected to a pair of independent air systems 166 and 167, respectively, having pressure sensitive switches 168 and 169 incorporated in the control circuitry 170 and 171 of the drive motors 102 and 103, so that the drive motor for each gage jaw is de-energized when the pressure in the corresponding air system reaches a predetermined value, irrespective of the pressure in the air system connected to the other gage jaw.

A suitable pair of bushings 175 and 176 are provided in the gage frame 101 to insure the smooth displacement of the gage jaws 118 and 137, and the interior of the gage frame is preferably pressurized by a suitable source of compressed air (not shown) to prevent grit, dirt or the like from entering therein.

The gaging apparatus illustrated in FIGS. 4, 4A, 5 and 6 is especially useful where it is difficult to determine the center line of the workpiece or to align the gage with the workpiece. The gage is swung into a gaging position by means of the pneumatic drive 152, after which the drive motors 102 and 103 are energized to extend the gage jaws toward the workpiece. As each gage jaw reaches a position at the predetermined distance from the work surface, the corresponding drive motor is de-energized. The relative position of the glass slides 125 and 145 indicates the relative position of the gage jaws, which is then a measure of the dimension of the workpiece, as before. It is apparent that this embodiment may be incorporated in a fully automated machine tool or may be employed manually, as desired.

Figure 4B:
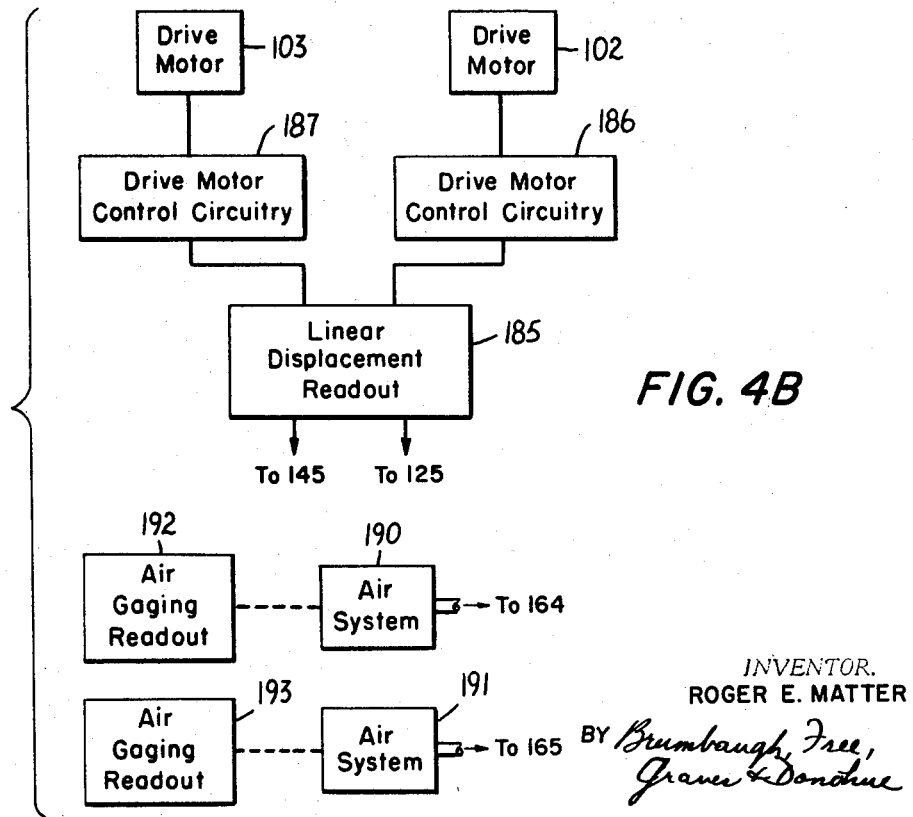
FIG. 4B is a block diagram of control apparatus to be used in conjunction with the gaging apparatus of FIG. 4 in another embodiment of the invention.
Figure 5:
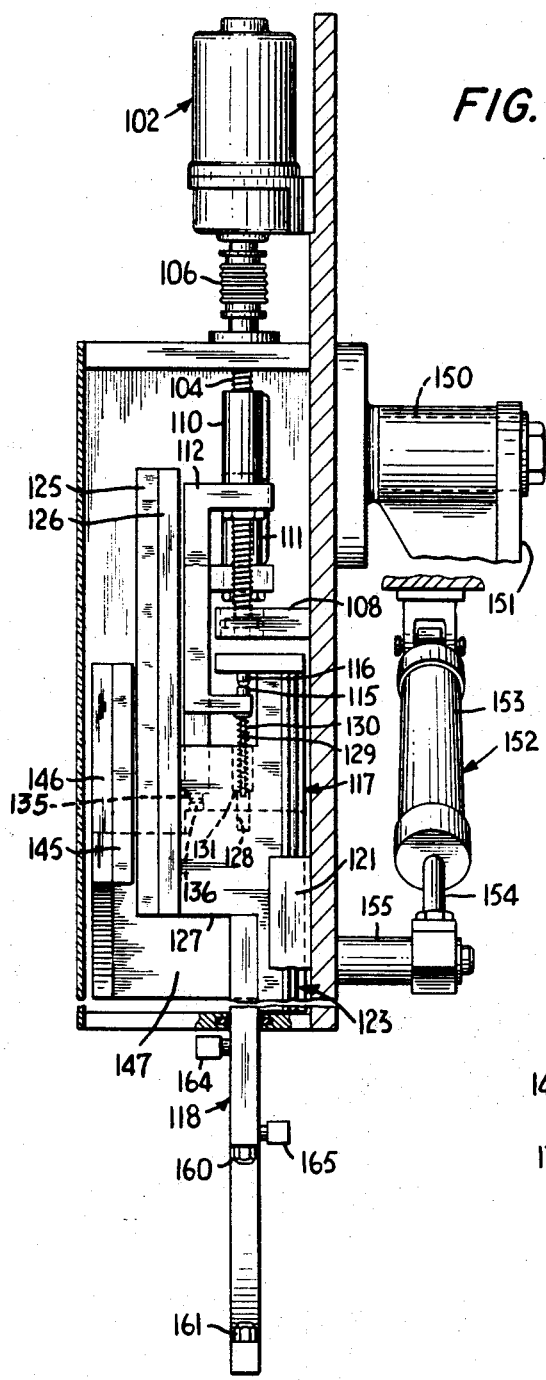
FIG. 5 is a front elevational view taken in a plane indicated by the line 5—5 of FIG. 4 and looking in the direction of the arrows.
Figure 6:
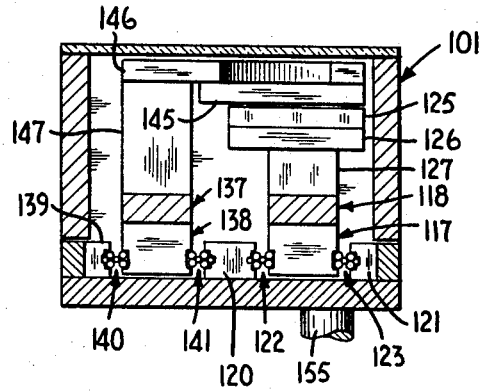
FIG. 6 is a sectional view taken in a plane indicated by the line 6—6 of FIG. 4 and looking in the direction of the arrows.

FIG. 4B is a block diagram of control apparatus for use with the gaging apparatus shown in FIGS, 4, 5 and 6 in a further embodiment of the invention. The linear displacement readout 185, including the sensing elements 125 and 145, is coupled to suitable drive motor control circuitry 186 and 187, by means of which the operation of the drive motors 102 and 103, respectively, is controlled Normally the drive motors are simultaneously energized or de-energized, the readout 185 feeding back the relative position of the gage jaws 118 and 137 to the control circuitry so that the gage jaws may be accurately positioned at predetermined locations.

The nozzles 160 and 161 of the gage jaws 118 and 137 communicate through the fittings 164 and 165 with a pair of independent air systems 190 and 191, respectively. Operatively associated with the air systems 190 and 191 are a pair of conventional air gaging readout systems 192 and 193, respectively.

The operation of this embodiment is similar to that including the control apparatus of FIG. 1B. Thus, the gage jaws are swung to a gaging position by the pneumatic drive 152, after which the motors 102 and 103 are energized to displace the gage jaws toward the workpiece until the jaws reach a predetermined relative position, when the drive motors are de-energized in response to the linear displacement readout 185. The distances between the nozzles 160 and 161 and the workpiece are then indicated by a pair of conventional air gaging readout systems 192 and 193, which are operatively associated with the air systems 190 and 191, respectively. The measurement having been made, the gage may be retracted by the pneumatic drive 152, the gage jaws being left in the predetermined relative position to facilitate additional measurements of the workpiece. It is apparent that this embodiment may be used in an automated machine tool or may be employed manually, as desired.

The provision of an independent air system and readout for each gage jaw enables the jaws to be readily adjusted with respect to a machine tool so that the nozzles are equidistant from a workpiece being shaped by that machine tool. After a gage block or master is inserted in the machine tool, one of the two drive motors 102 and 103 is independently energized to displace the corresponding gage jaw until the two nozzles are identically spaced from the workpiece, as indicated by a comparison of the reading of the two air gaging readouts 192 and 193. Once adjusted, the drive motors would be operated simultaneously for gaging workpieces. If it is difficult to determine the center line of a workpiece, the independent air systems and readouts enable the measurement of the workpiece by adding the readings of the two air gaging readouts. This may be readily accomplished visually or by conventional summing techniques if the gage is incorporated in an automated machine tool.

Although the invention has been described with reference to specific embodiments, modifications and variations will readily occur to those skilled in the art. For example, three or more of these jaws could be independently driven in order to determine the size of an irregularly shaped object. Therefore, the invention is not to be construed as limited to the specific embodiments described, but all such variations and modifications are included within the intended scope of the invention as defined by the following claims.

I claim:

1. Gaging apparatus for measuring a dimension of a workpiece comprising:
   a pair of gage jaws disposed in spaced relation to each other, each gage jaw adapted to be displaced toward and away from the other gage jaw,
   positive drive means for displacing the gage jaws toward and away from each other,
   means for indicating the relative position of the gage jaws, and
   means responsive to the indicating means for de-energizing the drive means when the gage jaws reach a predetermined relative position.

2. Apparatus according to claim 1 wherein the drive means displaces the gage jaws simultaneously toward and simultaneously away from each other.

3. Apparatus according to claim 1 wherein the drive means includes means for independently displacing each gage jaw.

4. Apparatus according to claim 1 including air jet means mounted on at least one gage jaw for sensing the distance between the gage jaw and the workpiece.

5. Apparatus according to claim 1 including means for selectively placing the gage jaws in a gaging position in which the jaws may be displaced toward and away from the workpiece and in a retracted position remote from the workpiece.

6. Automatically self-adjusting gaging apparatus for measuring a dimension of a workpiece comprising:
a pair of gage jaws disposed in spaced relation to each other, each gage jaw adapted to be displaced toward and away from the workpiece,
drive means for displacing the gage jaws toward and away from the workpiece,
air jet means mounted on each gage jaw for sensing the distance between each gage jaw and the workpiece,
means responsive to the air jet means for de-energizing the drive means when each gage jaw reaches a position at a predetermined distance from the workpiece, and
means for indicating the relative position of the gage jaws.

7. Apparatus according to claim 6 wherein the drive means displaces the gage jaws simultaneously toward and simultaneously away from the workpiece.

8. Apparatus according to claim 6 wherein the drive means includes means for independently displacing each gage jaw.

9. Apparatus according to claim 6 wherein the drive means includes a pair of coaxially mounted drive members coupled to the gage jaws.

10. Apparatus according to claim 9 including sleeve means mounted on one of the drive members and extending in cooperative relation to the other drive member for preventing foreign matter from entering between the two members.

11. Automatically self-adjusting gaging apparatus for use in an automated machine tool operated in accordance with a program to produce a workpiece of desired dimensions comprising:
a pair of opposed gage jaws adapted to be displaced toward and away from each other,
means responsive to the program for selectively placing the gage jaws in a gaging position in which the jaws may be displaced toward and away from the workpiece and in a retracted position remote from the workpiece,
drive means responsive to the program for selectively displacing the gage jaws toward and away from each other,
air jet means mounted on each gage jaw for sensing the distance between each gage jaw and the workpiece,
means responsive to the air jet means for de-energizing the drive means when each gage jaw reaches a position at a predetermined distance from the workpiece, and
means for indicating the relative position of the gage jaws.

12. Gaging apparatus for use in an automated machine tool operated in accordance with a program to produce a workpiece of desired dimensions comprising:
a pair of opposed gage jaws adapted to be displaced toward and away from each other,
means responsive to the program for selectively placing the gage jaws in a gaging position in which the jaws may be displaced toward and away from the workpiece and in a retracted position remote from the workpiece,
drive means responsive to the program for selectively displacing the gage jaws toward and away from each other,
means for indicating the relative position of the gage jaws,
means responsive to the indicating means for de-energizing the drive means when the gage jaws reach a predetermined relative position, and
air jet means mounted on each gage jaw for sensing the distance between each gage jaw and the workpiece.

13. A method of measuring a dimension of a workpiece comprising the steps of:
placing a pair of gage jaws in spaced relation to the workpiece,
displacing the gage jaws toward the workpiece,
sensing the relative position of the gage jaws,
terminating the displacing of the gage jaws in response to the sensed relative position thereof when the gage jaws reach a predetermined relative position, and
sensing the distance between each gage jaw and the workpiece.

14. Gaging apparatus for measuring a dimension of a workpiece comprising:
at least one gage jaw adapted to be placed in gaging relation to the workpiece,
drive means for displacing the gage jaw toward and away from the workpiece,
means for indicating the position of the gage jaw, and
means responsive to the indicating means for de-energizing the drive means when the gage jaw reaches a predetermined position.

15. Apparatus according to claim 14 including air jet means mounted on the gage jaw for sensing the distance between the gage jaw and the workpiece.

16. Automatically self-adjusting gaging apparatus for measuring a dimension of a workpiece comprising:
at least one gage jaw adapted to be placed in gaging relation to the workpiece,
drive means for displacing the gage jaw toward and away from the workpiece,
air jet means mounted on the gage jaw for sensing the distance between the gage jaw and the workpiece,
means responsive to the air jet means for de-energizing the drive means when the gage jaw reaches a position at a predetermined distance from the workpiece, and
means for indicating the position of the gage jaw.

References Cited

UNITED STATES PATENTS

| 3,194,055 | 7/1965 | Knobel | 73—37.5 |
|---|---|---|---|
| 1,977,969 | 11/1934 | McIntosh | 73—37.5 XR |
| 2,019,066 | 11/1935 | Balsinger | 73—37.5 XR |
| 2,115,351 | 4/1938 | Terry et al. | 33—147 |
| 2,880,514 | 4/1959 | Wood | 33—164 |
| 3,002,284 | 11/1961 | Sunnen | 33—164 |
| 3,190,007 | 6/1965 | De Nicola et al. | 33—147 |

W. HENRY, *Assistant Examiner.*

DAVID SCHONBERG, *Primary Examiner.*

UNITED STATES PATENT OFFICE
CERTIFICATE OF CORRECTION

Patent No. 3,400,573                      September 10, 1968

Roger E. Matter

It is certified that error appears in the above identified patent and that said Letters Patent are hereby corrected as shown below:

Column 4, line 66, beginning with "The workpiece" cancel all to and including "as necessary." in line 73, same column 4, and insert The workpiece dimension having been determined, the drive motor 33 is energized through the control circuitry 35 to rotate the feed screw 26 in the opposite direction to displace the gage jaws away from the workpiece, and the positioning motor 20 is energized through the control circuitry 21 to rotate the gaging apparatus away from the workpiece so that additional cuts may be made by a machine tool, for example, as necessary.

Column 8, line 39, "reading" should read -- readings --.

Signed and sealed this 13th day of January 1970.

(SEAL)
Attest:

EDWARD M. FLETCHER, JR.                 WILLIAM E. SCHUYLER, JR.
Attesting Officer                         Commissioner of Patents